(12) United States Patent
Yelland et al.

(10) Patent No.: US 6,219,678 B1
(45) Date of Patent: Apr. 17, 2001

(54) SYSTEM AND METHOD FOR MAINTAINING AN ASSOCIATION FOR AN OBJECT

(75) Inventors: Phillip M. Yelland, San Francisco; David Ungar, Palo Alto, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/104,426

(22) Filed: Jun. 25, 1998

(51) Int. Cl.$^7$ ........................................ G06F 17/30
(52) U.S. Cl. ............................... 707/206; 707/103
(58) Field of Search ........................ 707/206, 100–103, 707/1–4

(56) References Cited

U.S. PATENT DOCUMENTS

| | | | |
|---|---|---|---|
| 5,241,673 | * | 8/1993 | Schelvis ............................. 707/206 |
| 5,485,613 | * | 1/1996 | Engelstad et al. .................. 707/206 |
| 5,659,751 | | 8/1997 | Heninger ............................ 395/685 |
| 5,930,807 | * | 7/1999 | Ebrahim et al. ................... 707/206 |
| 6,098,080 | * | 8/2000 | Endicott et al. ................... 707/206 |

OTHER PUBLICATIONS

"The Case for Java as a Programming Language," Van Hoff, A. IEEE Internet Compuitng, Jan.–Feb. 1997, vol. 1, issue 1, pp. 51–56.*

Jaworski, "Java 1.1 Developer's Guide," 2nd Ed., 1997, Sams.net Publishing.

T. Lindholm et al., "The Java Virtual Machine Specification," Addison Wesley, 1996.

R. Jones et al., "Garbage Collection, Algorithms For Automatic Dynamic Memory Management," 1996.

* cited by examiner

*Primary Examiner*—Hosain T. Alam
(74) *Attorney, Agent, or Firm*—Finnegan, Henderson, Farabow, Garrett & Dunner, L.L.P.

(57) ABSTRACT

A system optimizes representation of associations in an object-oriented programming environment. The system includes a memory and a memory manager. The memory stores a table and a plurality of objects. Each of the objects includes a header that stores a flag. The table stores a plurality of entries. Each of the table entries stores an association and a reference identifying one of the objects in the memory. The memory manager periodically determines the state of the flags in the object headers. When the flag of an object is determined to be in a predetermined state, the memory manager selects the table entry having a reference identifying the object and stores the association from the selected table entry into the object.

32 Claims, 7 Drawing Sheets

SYSTEM AND METHOD FOR MAINTAINING AN ASSOCIATION FOR AN OBJECT

BACKGROUND OF THE INVENTION

The present invention is directed to object-oriented programming systems, and more particularly to optimizing the representation of associations in object-oriented programming systems.

Conventional object-oriented programming systems often record the association between a particular object and another object or a data structure internal to the system. Frequently, however, the demographics (e.g., usage pattern) of such associations cannot be predicted with accuracy ahead of time. Whether a particular object participates in an association depends upon the activities of the applications hosted by the system.

An example of one conventional object-oriented programming system that uses associations is Sun Microsystems™ Java™ object-oriented programming language. Java and Sun Microsystems are trademarks or registered trademarks of Sun Microsystems, Inc. in the United States and other countries.

Most implementations of the Java programming language associate a secondary structure with an object in the event that a synchronized method (i.e., a method whose invocation is synchronized on its receiver) is invoked on that object. This secondary structure is called a monitor and engages a variety of mechanisms in the Java™ runtime system and the native platform for the purpose of coordinating concurrent execution of synchronized methods. For efficiency reasons, the monitor is typically allocated for and associated with an object only if a synchronized method is invoked upon that object. Unfortunately, such a determination can only be made at the actual point of method invocation.

Two conventional approaches exist for recording associations. The first approach stores the association, which takes the form of a reference to the monitor, in a separate data structure, such as a hash table. This approach economizes the use of space because space in the hash table need not be allocated until actually required to record an association, but imposes a run-time penalty in the form of the time required to search the hash table for the location of the association.

The second approach alleviates this run-time penalty by storing the association in the header of the object in memory. The object header is an area of memory of fixed size that prefixes every object. Storing the association in the object header considerably increases the speed of retrieval of the association because the association is available directly from the object. However, given that the association demographics cannot be predicted ahead of time, a conservative approach would require that every object be provided with space for the storage of an association. This leads to a considerable waste of valuable memory space.

Therefore, a need exists for a way to record associations while alleviating the problems of the two conventional approaches.

SUMMARY OF THE INVENTION

Systems and methods consistent with the present invention address this need by temporarily storing associations in a table until invocation of the next automatic memory management function, such as garbage collection, at which time the memory management function stores the associations in the objects. The systems and methods consistent with the present invention take advantage of the automatic memory management function to add or remove space in the objects for the storage of associations.

A system consistent with the present invention optimizes representation of associations in an object-oriented programming environment. The system includes a memory and a memory manager. The memory stores a table and a plurality of objects. Each of the objects includes a header that stores a flag. The table stores a plurality of entries. Each of the table entries stores an association and a reference identifying one of the objects in the memory.

The memory manager periodically determines the state of the flags in the object headers. When the flag of an object is determined to be in a predetermined state, the memory manager selects the table entry having a reference identifying the object and stores the association from the selected table entry into the object.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention optimize the representation of associations by taking advantage of automatic memory management functions, such as garbage collection mechanisms. Relocating or copying garbage collection mechanisms relocate objects in order to reduce the fragmentation of memory in the face of object mortality and reclamation. Relocation entails copying an object's header and data from one area of memory to another, and thereafter updating all references to the object. The systems and methods consistent with the present invention take advantage of the relocating features of the garbage collection mechanisms to add or remove space in the object for storage of an association.

In particular, when an object is first created, the system stores the object in memory without space for the storage of an association. When an association is later recorded for the object, the system temporarily stores the association in a data structure, such as a table. Thereafter, when the system performs garbage collection, the system allocates additional memory space in the object and stores the association in this allocated memory space. As a result, systems consistent with the present invention are an improvement over conventional object association systems, because the systems economize the use of valuable memory space while avoiding the run-time penalty incurred by conventional systems.

Exemplary Computer System

Figure 1:
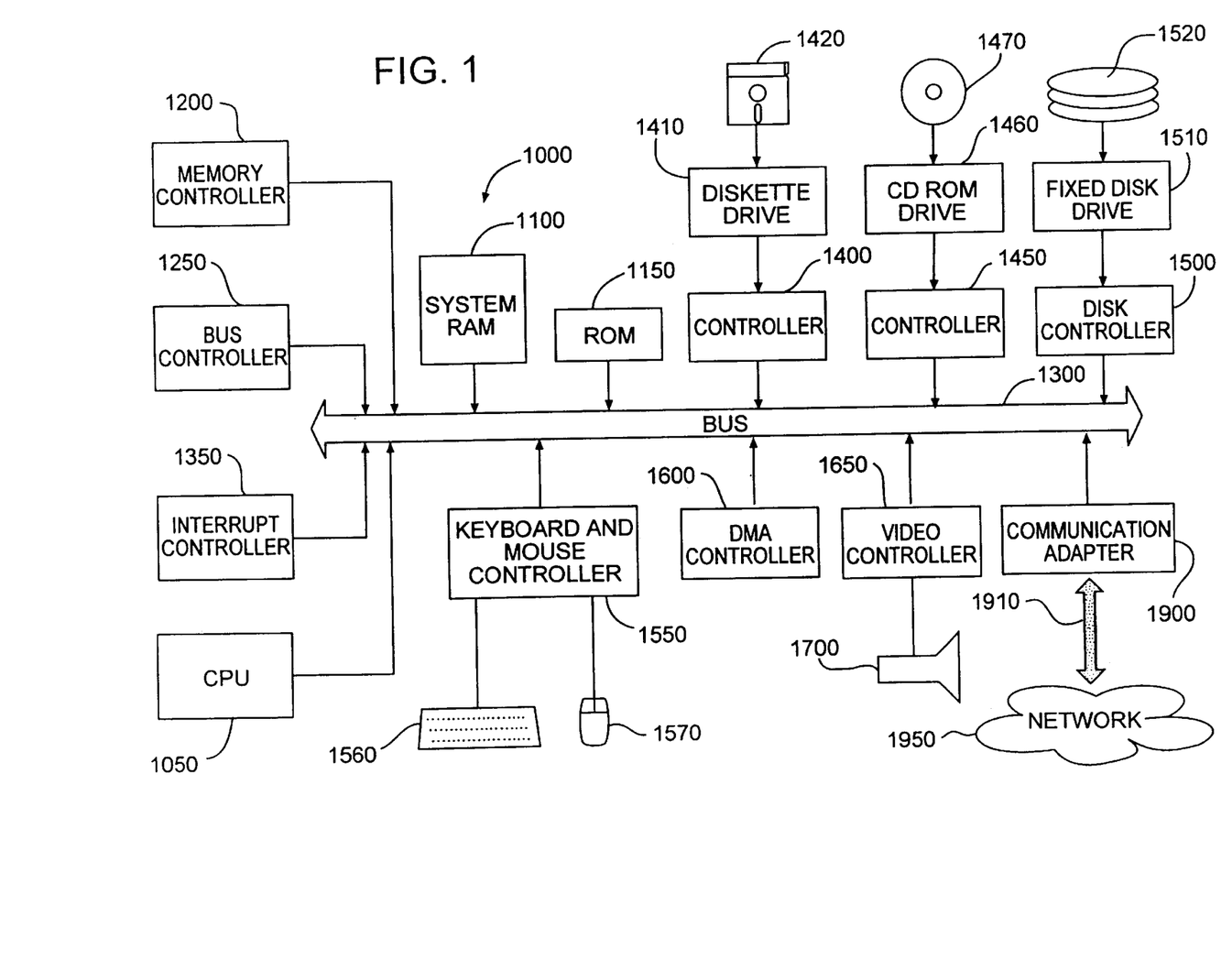
FIG. 1 is a diagram of an exemplary computer system consistent with the present invention.

FIG. 1 is a diagram of a system architecture for an exemplary computer system with which the invention may be implemented. The exemplary computer system of FIG. 1 is for descriptive purposes only. Although the description may refer to terms commonly used in describing particular computer systems, such as an IBM PS/2 personal computer, the description and concepts equally apply to other computer systems such as network computers, workstations, and even mainframe computers having architectures dissimilar to FIG. 1.

Furthermore, the implementation is described with reference to a computer system implementing the Java programming language and Java™ Virtual Machine specifications, although the invention is equally applicable to other computer systems having similar requirements. Specifically, the present invention may be implemented with both object-oriented and non-object-oriented programming systems.

Computer system 1000 includes a central processing unit (CPU) 1050, which may be implemented with a conventional microprocessor, a random access memory (RAM) 1100 for temporary storage of information, and a read only memory (ROM) 1150 for permanent storage of information. A memory controller 1200 is provided for controlling RAM 1100.

A bus 1300 interconnects the components of computer system 1000. A bus controller 1250 is provided for controlling bus 1300. An interrupt controller 1350 is used for receiving and processing various interrupt signals from the system components.

Mass storage may be provided by diskette 1420, CD ROM 1470, or hard drive 1520. Data and software may be exchanged with computer system 1000 via removable media such as diskette 1420 and CD ROM 1470. Diskette 1420 is insertable into diskette drive 1410 which is, in turn, connected to bus 1300 by a controller 1400. Similarly, CD ROM 1470 is insertable into CD ROM drive 1460 which is, in turn, connected to bus 1300 by controller 1450. Hard disk 1520 is part of a fixed disk drive 1510 which is connected to bus 1300 by controller 1500.

User input to computer system 1000 may be provided by a number of devices. For example, a keyboard 1560 and mouse 1570 are connected to bus 1300 by controller 1550. It will be obvious to those reasonably skilled in the art that other input devices, such as a pen, a tablet, and/or a speech recognition device may be connected to bus 1300 and an appropriate controller and software, as required. DMA controller 1600 is provided for performing direct memory access to RAM 1100. A visual display is generated by video controller 1650 which controls video display 1700.

Computer system 1000 also includes a communications adaptor 1900 which allows the system to be interconnected to additional computing resources via a local area network (LAN) or a wide area network (WAN), such as the Internet, schematically illustrated by bus 1910 and network 1950. Signals traveling through network 1950 can generally be referred to as "carrier waves," which transport information. Methods necessary to implement the present invention can be transported via the carrier waves to or from the additional computing resources.

Operation of computer system 1000 is generally controlled and coordinated by operating system software. The operating system controls allocation of system resources and performs tasks such as memory management, process scheduling, networking, and services, among other things.

An important concept in memory management is the manner in which memory is allocated to a task, deallocated, and then reclaimed. Memory deallocation and reclamation may be explicit and controlled by an executing program, or may be carried out by another special purpose program which locates and reclaims memory which is unused, but has not been explicitly deallocated. "Garbage collection" is the term used in technical literature and the relevant arts to refer to a class of algorithms utilized to carry out storage management, specifically automatic memory reclamation. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

An object may be located by a "reference," or a small amount of information that can be used to access the object. One way to implement a reference is by means of a "pointer" or "machine address," which uses multiple bits of information, however, other implementations are possible. General-purpose programming languages and other programmed systems often use references to locate and access objects. Such objects can themselves contain references to data, such as integers or floating-point numbers, and to yet other objects. In this manner, a chain of references can be created, each reference pointing to an object which, in turn, points to another object.

A subclass of garbage collectors known as "relocating" or "copying" garbage collectors, relocates objects that are still reachable by an executing program. Relocation of an object is accomplished by making a copy of the object to another region of memory, then replacing all reachable references to the original object with references to the new copy. The memory occupied by the original object may then be reclaimed and reused. Relocating garbage collectors have the desirable property that they compact the memory used by the executing program and thereby reduce memory fragmentation, which is typically caused by non-compacting garbage collectors.

Figure 2:
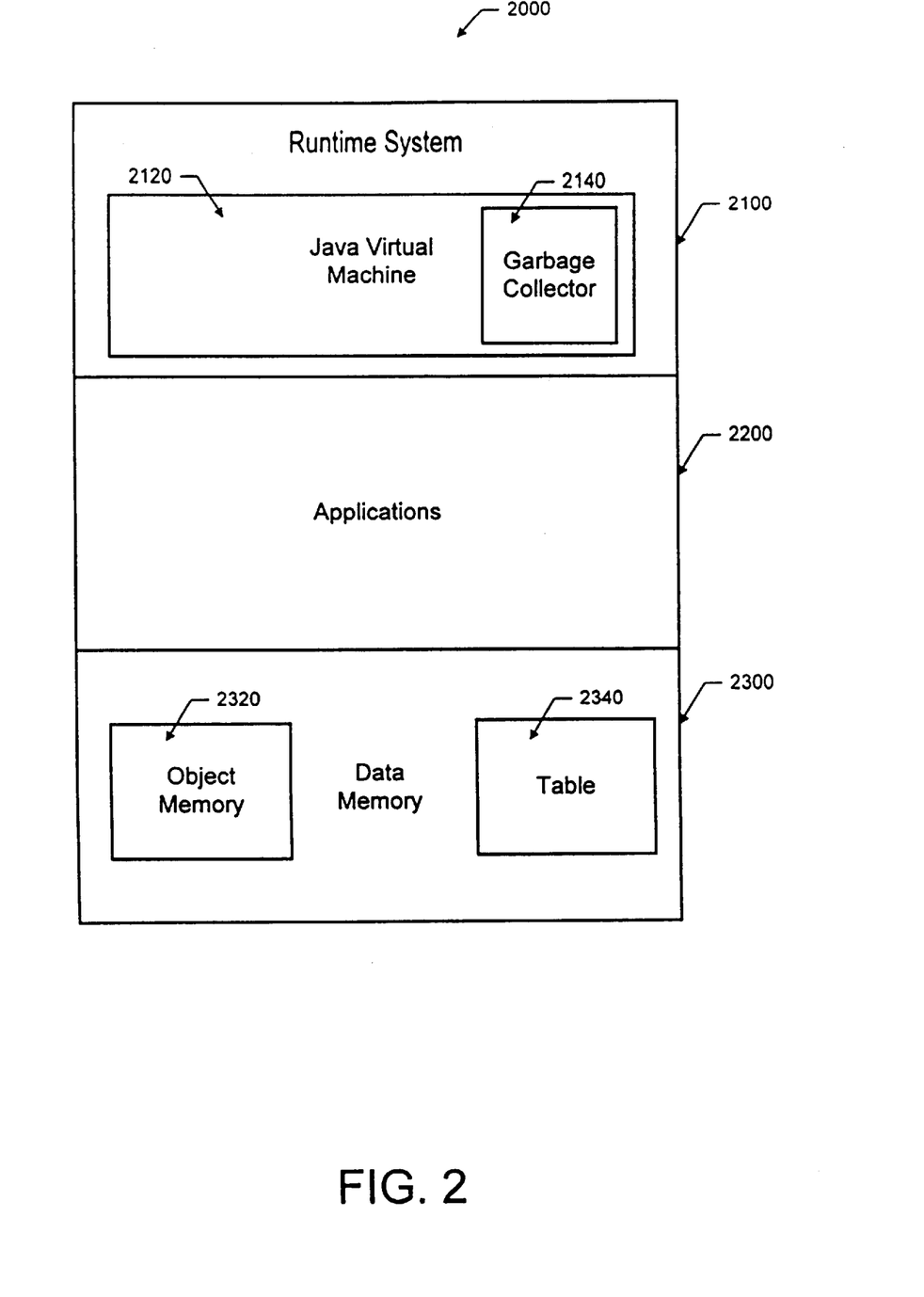
FIG. 2 is a diagram of a memory of FIG. 1 in an implementation consistent with the present invention.

FIG. 2 is a diagram of memory 2000 containing a garbage collector in an implementation consistent with the present invention. Memory 2000 preferably includes system RAM 1100 (FIG. 1), but may alternatively include other types of memories, including any of the memories shown in FIG. 1.

Memory 2000 includes runtime system 2100, applications 2200, and data memory 2300. At the core of runtime system 2100 is Java Virtual Machine (JVM) 2120. JVM 2120 is a microprocessor implemented in software that runs using the capabilities provided by the operating system and the computer hardware. The JVM is described, for example, in a text entitled "The Java Virtual Machine Specification," by Tim Lindholm and Frank Yellin, Addison Wesley, 1996.

JVM 2120 includes garbage collector 2140. Garbage collector 2140 performs memory management functions, such as automatic allocation and deallocation of memory resources as they are needed by applications 2200. Garbage collector 2140 typically runs as a separate, low-priority background process that executes when no other processes are active. It checks object references and frees those objects that are no longer in use. Garbage collector 2140 also performs relocating functions to relocate objects that are still reachable by applications 2200.

Applications 2200 include programs executed by CPU 1050 and interpreted by JVM 2120. The programs include object-oriented programs, such as programs written in the Java programming language, as well as multiplatform programs, secure programs, distributed networking programs, multithreaded programs, web programs, etc. Some of the programs operate on objects stored in data memory 2300.

Figure 3:
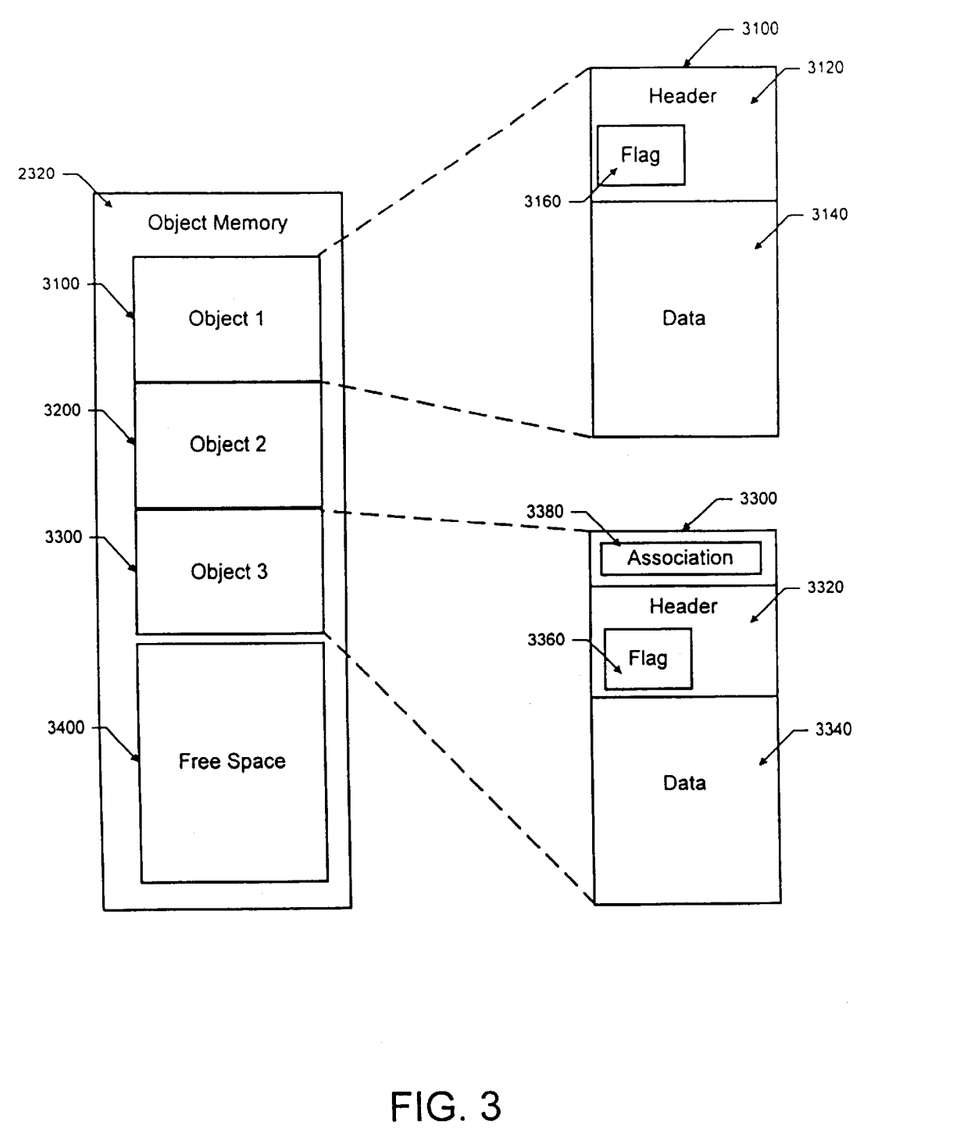
FIG. 3 is a diagram of the object memory of FIG. 2 in an implementation consistent with the present invention.

Data memory 2300 stores data used by CPU 1050 and JVM 2120, and includes object memory 2320 and table 2340. FIG. 3 is a diagram of object memory 2320. Object memory 2320 stores multiple objects 3100, 3200, and 3300, and free space 3400.

Object 3100, for example, includes header portion 3120 and data portion 3140. Header 3120 stores flag 3160. Flag 3160 is a two bit flag that distinguishes between three states: (1) a state where there is no association for the object; (2) a state where an association for the object is stored in table 2340; and (3) a state where an association for the object is stored in the object.

In some instances, such as in the third state above, an object stores an association. Object 3300, for example, includes header portion 3320, data portion 3340, and association portion 3380. As shown in FIG. 3, association 3380 is stored prior to header 3320 in object 3300. Alternatively, association 3380 may be stored at the end of object 3300. Header 3320 stores a two bit flag 3360. As will be discussed below, flag 3360 is set in this case to indicate that there is an association for object 3300 stored in the object.

Figure 4:
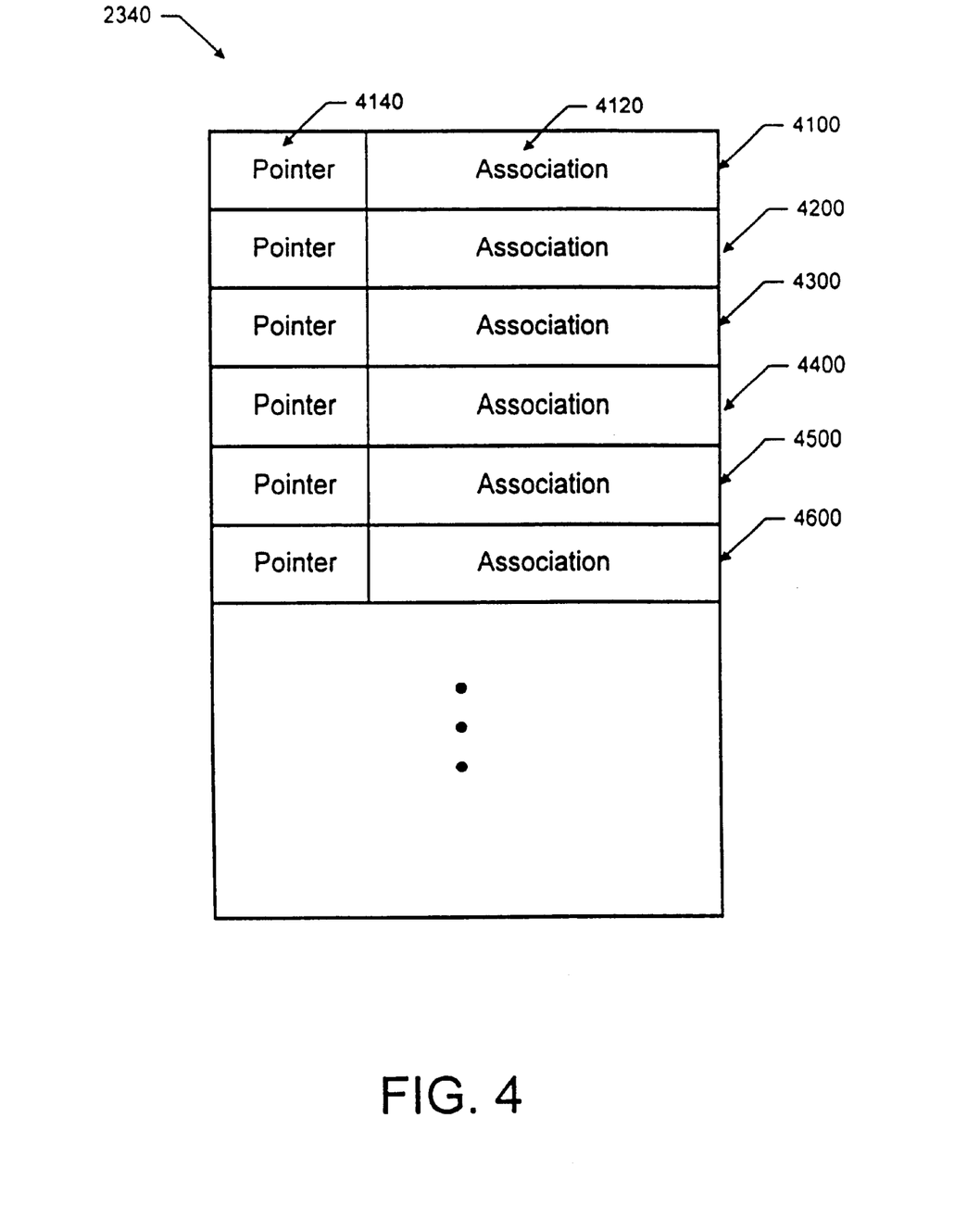
FIG. 4 is a diagram of the table of FIG. 2 in an implementation consistent with the present invention.

Table 2340 temporarily stores associations as entries in a table format, such as a hash table format. FIG. 4 is a diagram of table 2340 in an implementation consistent with the present invention. Table 2340 includes several entries 4100 through 4600 recorded on an as-needed basis. Each entry (entry 4100, for example) stores an association 4120 and a pointer 4140. Pointer 4140 identifies the object in object memory 2320 to which association 4120 belongs. Pointer 4140 may be implemented by a machine address that identifies the location of the object in object memory 2320, but other implementations are possible.

Exemplary System Processing

Figure 5:
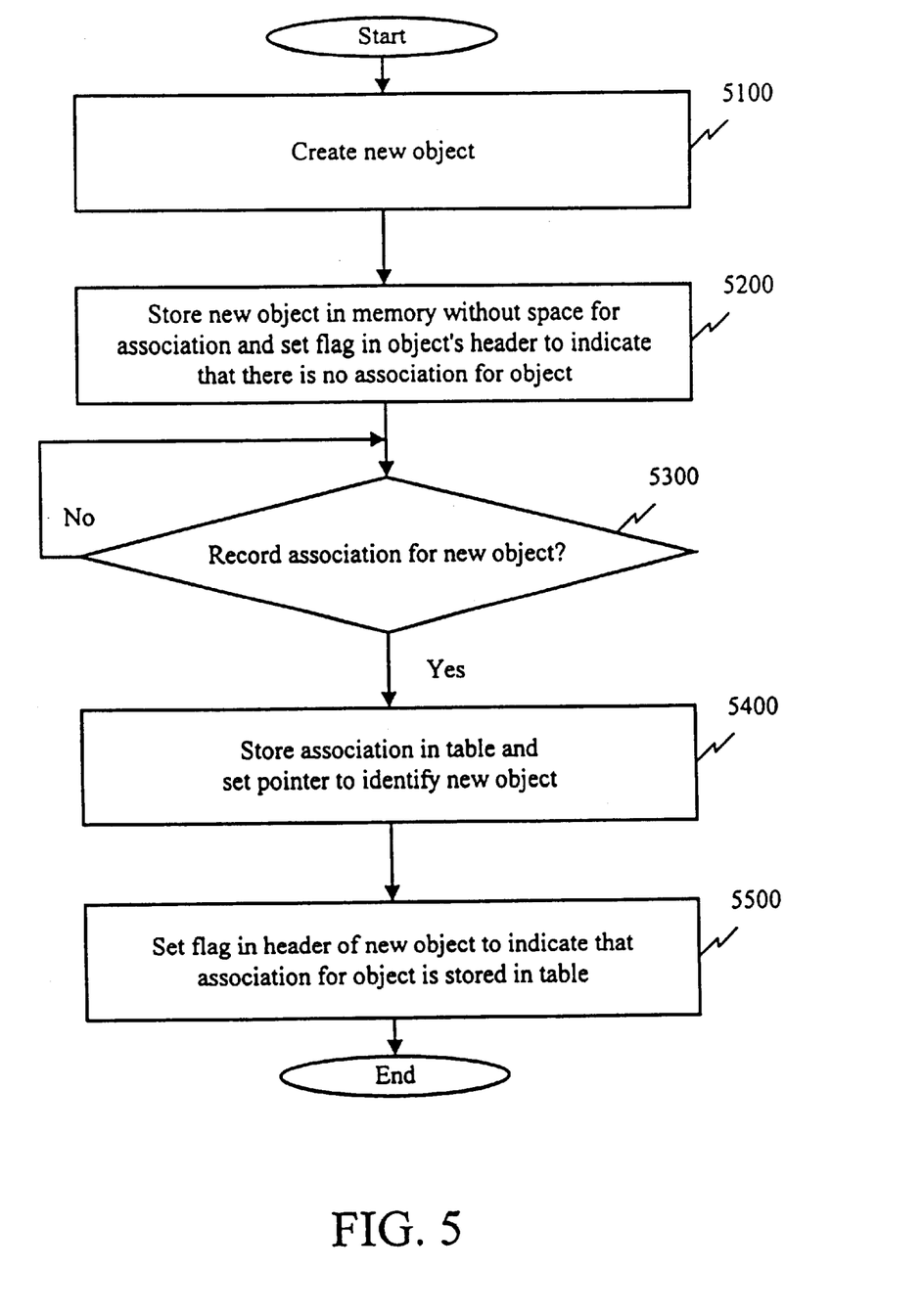
FIG. 5 is a flowchart of object creation activity consistent with the present invention.

FIG. 5 is a flowchart of object creation activity consistent with the present invention. In executing an object-oriented programming language, such as the Java programming language, JVM 2120 performs many operations, including the creation of new objects [step 5100]. While JVM 2120 will be described as performing the object creation activity, the activity is actually performed by CPU 1050 through runtime system 2100.

When JVM 2120 creates the new object, for example, object 3100 (FIG. 3), it stores object 3100 in object memory 2320 [step 5200]. JVM 2120 allocates only enough space within object memory 2320 for storing data 3140 and header 3120, including flag 3160. JVM 2120 does not allocate space within object 3100 for recording an association. JVM 2120 sets flag 3160 to indicate that there is no association recorded for the new object [step 5200].

At some point, JVM 2120 may need to record an association for object 3100 [step 5300]. In this case, JVM 2120 stores the association in table 2340, as table entry 4100 (FIG. 4), for example, and sets pointer 4140 to identify object 3100 in object memory 2320 [step 5400]. JVM 2120 then sets flag 3160 in header 3120 to indicate that there is an association for the new object stored in table 2340 [step 5500].

Figure 6:
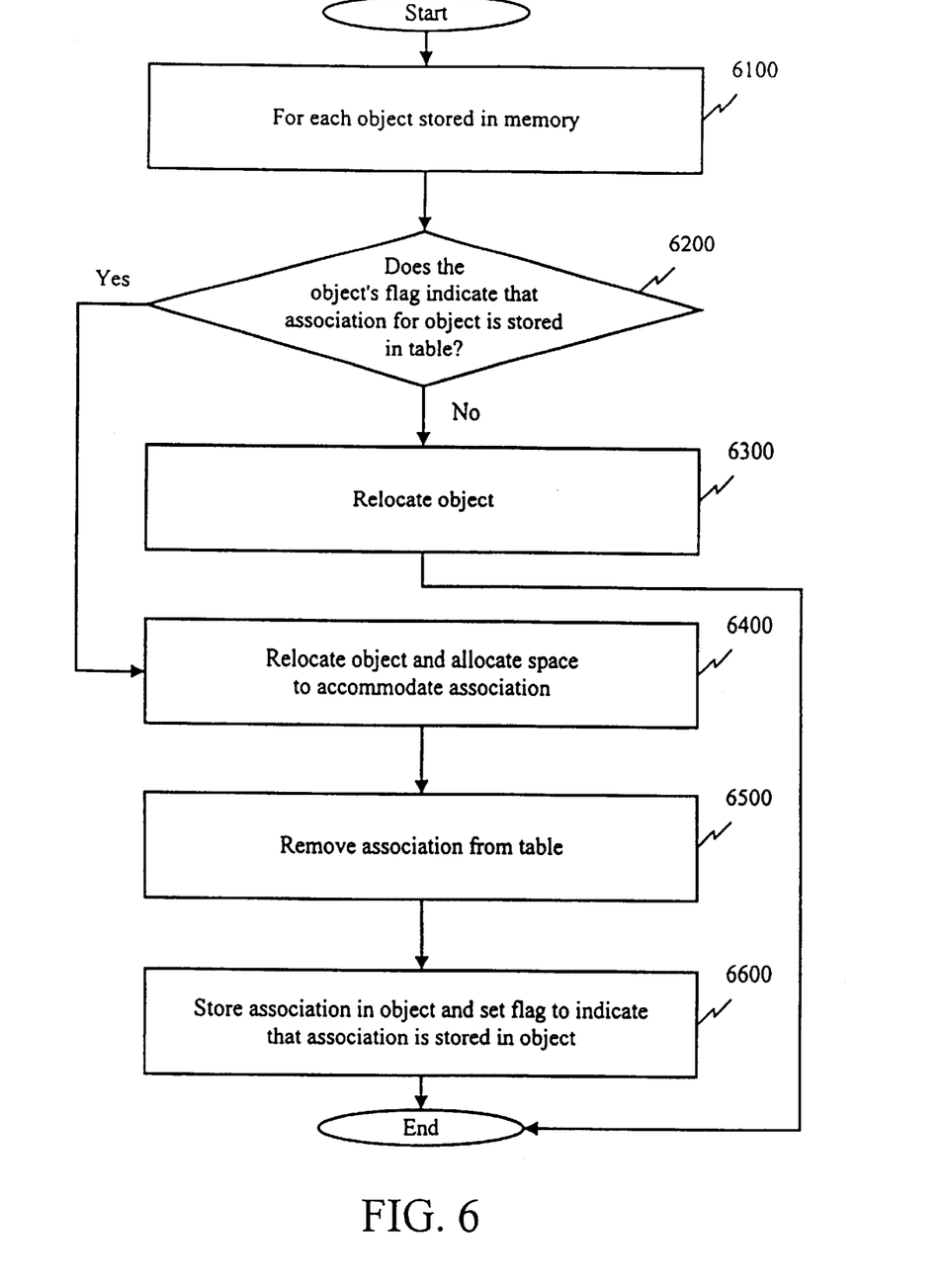
FIG. 6 is a flowchart of memory management activity consistent with the present invention.

As a memory manager, garbage collector 2140 periodically performs memory management functions, such as object relocation, to reduce the fragmentation in object memory 2320. FIG. 6 is a flowchart of memory management activity consistent with the present invention. As part of the memory management functions, garbage collector 2140 performs certain operations on the objects stored in object memory 2320 [step 6100].

Garbage collector 2140 examines the flag in the header of an object to determine whether an association for the object is stored in table 2340 [step 6200]. When the object's flag indicates that either there is no association for the object or that the association is stored in the object, garbage collector 2140 relocates the object according to conventional memory management techniques [step 6300].

When the object's flag indicates that the association is stored in table 2340, however, garbage collector 2140 relocates the object according to conventional memory management techniques, while allocating sufficient space in the object, prior to the object's header, for storage of the association [step 6400]. Garbage collector 2140 then searches table 2340 to identify the association belonging to the object. Garbage collector 2140 matches associations to objects using the pointers stored in the table entries.

When garbage collector 2140 identifies the association for the object, garbage collector 2140 removes the association from table 2340 [step 6500]. Garbage collector 2140 deletes the entry containing the association in table 2340 to free space for storage of subsequent associations. Garbage collector 2140 then stores the association in the allocated space prior to the object's header, such as object 3300 in FIG. 3, and sets the flag to indicate that the association is stored in the object [step 6600].

Figure 7:
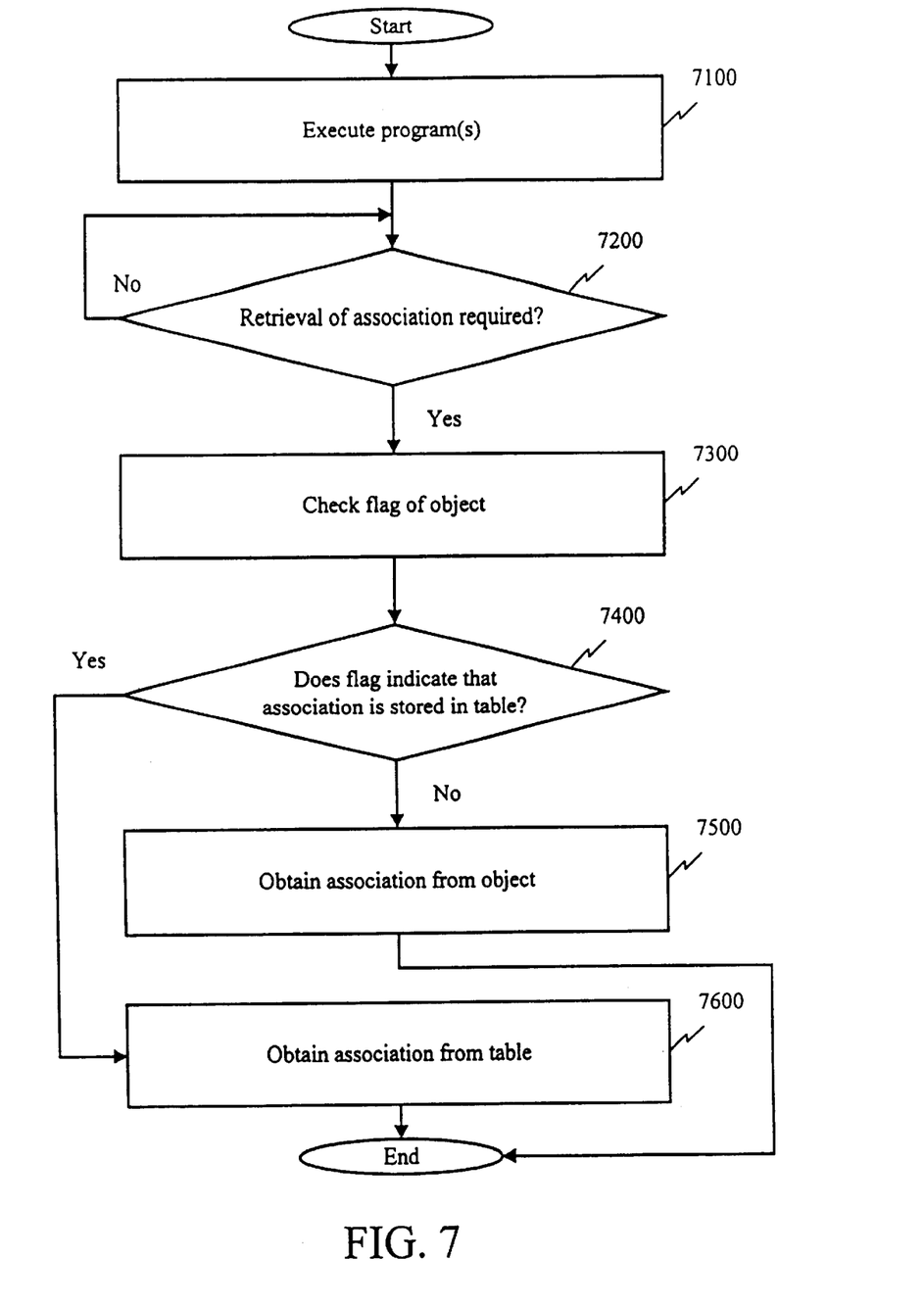
FIG. 7 is a flowchart of program execution activity consistent with the present invention.

Many times during execution of object-oriented programs, JVM 2120 retrieves an object's association data. FIG. 7 is a flowchart of program execution activity consistent with the present invention. When JVM 2120 determines that it needs an association during execution of a program [steps 7100 and 7200], JVM 2120 checks the flag in the object's header in object memory 2320 [steps 7300 and 7400]. When the flag indicates that the association is stored in the object, JVM 2120 obtains the association from the allocated space prior to the object's header [step 7500]. When the flag indicates that the association is stored in table 2340, however, JVM 2120 retrieves the association from table 2340 using the pointer in the table entry to identify the correct association [step 7600].

Conclusion

Systems and methods consistent with the present invention optimize storage and retrieval of associations for objects by taking advantage of automatic memory management functions common to object-oriented programming systems.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, an implementation consistent with the present invention has been described as allocating no space in the object for storage of an association when an object is created. This need not be the case, however. Space could be allocated in the object for storage of an association when an object is created. In this case, if no association has been recorded by the time the garbage collector performs its next memory management functions, the space is removed when the garbage collector relocates the object. If an association is required thereafter, the JVM stores the association in the table and sets the flag in the object's header, as described above.

What is claimed is:

1. A system that represents associations in an object-oriented programming environment, comprising:

a memory configured to store both a plurality of objects, each of the objects including a header storing a flag, and a table with a plurality of entries, each of the table entries storing an association and a reference identifying one of the objects; and a memory manager configured to periodically determine a state of the flags in the object headers, when the flag of one of the objects is determined to be in a predetermined state, the memory manager selects the table entry having the reference identifying the one object and stores the association from the selected table entry in the one object.

2. The system of claim 1, wherein the memory manager includes:

an erasing element configured to remove the selected table entry from the table after the memory manager stores the association in the one object.

3. The system of claim 1, wherein the memory manager includes:

a memory allocator configured to allocate additional memory space to the one object to permit the storage of the association when the flag of the one object is determined to be in the predetermined state.

4. The system of claim 1, wherein the memory manager includes:

an object storage unit configured to initially store the objects in the memory with insufficient memory space for storage of associations.

5. The system of claim 1, wherein the memory manager includes:

an object storage unit configured to initially store the objects in the memory with sufficient memory space for storage of associations.

6. The system of claim 5, wherein the memory manager further includes:

a relocating unit configured to remove the memory space from the objects when no association has been stored in the objects after a predetermined period of time.

7. The system of claim 1, wherein the memory manager includes:

a garbage collector configured to periodically perform relocating garbage collection functions by which the garbage collector relocates the objects stored in the memory.

8. The system of claim 7, wherein the garbage collector includes:

a space allocator configured to allocate additional memory space to the one object upon object relocation when the flag of the one object is determined to be in the predetermined state.

9. A computer-implemented method for representing associations in an object-oriented programming system including a memory storing a table with a plurality of entries and storing a plurality of objects having headers, each of the headers storing a flag, the method comprising the steps of:

storing associations corresponding to ones of the objects as table entries in the table;

setting the flags in the headers of the corresponding objects to a predetermined state;

periodically determining a state of the flags; and writing the associations from the table entries into the corresponding objects when the flags of the corresponding objects are determined to be in the predetermined state.

10. The method of claim 9, further comprising the step of:

initially storing the objects in the memory with insufficient memory space for storage of associations.

11. The method of claim 9, further comprising the step of:

initially storing the objects in the memory with sufficient memory space for storage of associations.

12. The method of claim 11, wherein the initially storing step includes the substep of:

removing the memory space when no association has been stored in the objects after a predetermined period of time.

13. The method of claim 12, wherein the associations storing step includes the substep of:

storing the associations in the table only if the memory space has been removed.

14. The method of claim 9, wherein the writing step includes the substep of:

allocating additional memory space in the corresponding objects to permit the writing of the associations.

15. The method of claim 9, wherein the object-oriented programming system further includes a garbage collector that periodically performs relocating garbage collection functions by which the garbage collector relocates the objects stored in the memory, and wherein the determining and writing steps are part of the relocating garbage collection functions performed by the garbage collector.

16. The method of claim 15, wherein the writing step includes the substep of:

allocating additional memory space in the objects for storage of the associations upon object relocation when the flags of the objects are determined to be in the predetermined state.

17. A computer program product for representing associations in an object-oriented programming system including a memory containing a table with a plurality of entries and containing a plurality of objects having headers, each of the headers storing a flag, the computer program product comprising:

an association storage module configured to store associations corresponding to the objects as table entries in the table;

a flag setting module configured to set the flags in the headers of the objects to a predetermined state when the objects have associations stored in the table;

a flag checking module configured to periodically determine a state of the flags; and an association writing module configured to write the associations from the table entries into the corresponding objects when the flags of the corresponding objects are determined to be in the predetermined state.

18. The computer program product of claim 17, further comprising:

an object storage module configured to initially store the objects in the memory with insufficient memory space for storage of associations.

19. The computer program product of claim 17, further comprising:

an object storage module configured to initially store the objects in the memory with sufficient memory space for storage of associations.

20. The computer program product of claim 19, wherein the object storage module includes:
   a space removal module configured to remove the memory space when no association has been stored in the objects after a predetermined period of time.

21. The computer program product of claim 20, wherein the association storage module includes:
   a storing module configured to store the associations in the table only if the memory space has been removed.

22. The computer program product of claim 17, wherein the association writing module includes:
   a memory space allocating module configured to allocate additional memory space in the corresponding objects to permit the writing of the associations.

23. The computer program product of claim 17, further comprising:
   a garbage collector configured to periodically perform relocating garbage collection functions by which the garbage collector relocates the objects stored in the memory, the garbage collector executing the flag checking and the association writing modules as part of the relocating garbage collection functions.

24. The computer program product of claim 23, wherein the garbage collector includes:
   a memory space allocator configured to allocate additional memory space in the objects for storage of the associations upon object relocation when the flags of the objects are determined to be in the predetermined state.

25. A memory comprising:
   a first area configured to store a plurality of objects, each of the objects including a header storing a flag;
   a second area configured to store a plurality of associations corresponding to the objects stored in the first area, the flags in the headers of the objects being set to a predetermined state when the associations corresponding to the objects are stored in the second area; and
   a virtual machine configured to store the associations in the second area, the virtual machine periodically performing garbage collection functions by which the virtual machine determines a state of the flags in the headers of the objects stored in the first area, when the flags are determined to be in the predetermined state, the virtual machine writes the associations from the second area into the corresponding objects in the first area.

26. A system that represents associations in an object-oriented programming environment, comprising:
   a memory configured to store a virtual machine and a plurality of objects, each of the objects including a header having a flag and an area for storing an association, the flag being set to a first state when an association is stored in the association area and to a second state when no association is stored in the association area, the virtual machine being configured to insert associations into the association areas of the objects and to set the corresponding flags to the first state; and
   a memory manager configured to periodically determine a state of the flags in the object headers, when the flag of one of the objects is determined to be in the second state, the memory manager removes the association area from the one object.

27. A method for representing associations in an object-oriented programming system including a memory containing a virtual machine and a plurality of objects having headers, the method, executed by the virtual machine, comprising the steps of:
   storing an object in the memory with an area in the object header for storing a flag and an area for storing an association;
   setting the flag to a first state when no association is stored in the association area of the object, and to a second state when an association is stored in the association area of the object;
   periodically determining a state of the flag; and
   removing the association area from the object when the corresponding flag is determined to be in the first state.

28. In an object-oriented programming system including a memory containing a table configured to store a plurality of entries, an object area storing a plurality of objects having headers, each of the headers storing a flag, and a virtual machine, the virtual machine comprising:
   an association storage component configured to store associations corresponding to the objects as table entries in the table;
   a flag setting component configured to set the flags in the headers of the objects to a predetermined state when the objects have associations stored in the table; and
   a garbage collector configured to periodically determine a state of the flags, and to write the associations from the table entries into the corresponding objects when the flags of the corresponding objects are determined to be in the predetermined state.

29. A method that represents associations in an object-oriented programming environment, comprising the steps of:
   creating a new object;
   storing the new object in a memory;
   setting a flag in a header of the new object to a first predetermined state;
   storing an association for the new object in a table;
   setting the flag in the header of the new object to a second predetermined state; and
   periodically performing garbage collection functions, including the substeps of
      determining a state of the flag in the header of the new object,
      relocating the new object to another location in the memory and adding sufficient space for storage of the association when the flag is determined to be in the second predetermined state,
      removing the association from the table, and
      writing the association in the relocated object.

30. A system for representing associations in an object-oriented programming environment, comprising:
   means for storing a table with a plurality of entries;
   means for storing a plurality of objects having headers, each of the headers storing a flag;
   means for storing associations corresponding to ones of the objects as table entries in the table;
   means for setting the flags in the headers of the corresponding objects to a predetermined state when associations for the objects are stored in the table;
   means for periodically determining a state of the flags; and means for writing the associations from the table entries into the corresponding objects when the flags of the corresponding objects are determined to be in the predetermined state.

31. A system that represents associations in an object-oriented programming environment, comprising:

means for storing an object with an area in a corresponding object header that stores a flag and an area that stores an association;

means for setting the flag to a first state when no association is stored in the association area of the object, and to a second state when an association is stored in the association area of the object;

means for periodically determining a state of the flag; and     means for removing the association area from the object when the corresponding flag is determined to be in the first state.

32. A system that represents associations in an object-oriented programming environment, comprising:

means for creating a new object;

means for storing the new object in a memory, the new object having a header that stores a flag;

means for setting the flag in the header of the new object to a first predetermined state;

means for storing an association for the new object in a table;

means for setting the flag in the header of the new object to a second predetermined state when an association for the new object is stored in the table; and     means for periodically performing garbage collection functions, including         means for determining a state of the flag in the header of the new object,         means for relocating the new object to another location in the memory and adding sufficient space for storage of the association when the flag is determined to be in the second predetermined state,         means for removing the association from the table, and         means for writing the association in the relocated object.

\* \* \* \* \*